(12) United States Patent
Kosuge et al.

(10) Patent No.: US 7,896,421 B2
(45) Date of Patent: Mar. 1, 2011

(54) FLOOR STRUCTURE OF FOUR WHEELED UTILITY VEHICLE

(75) Inventors: Hideyoshi Kosuge, Kobe (JP); Toshinori Oki, Kako-gun (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 303 days.

(21) Appl. No.: 11/889,396

(22) Filed: Aug. 13, 2007

(65) Prior Publication Data

US 2008/0048469 A1  Feb. 28, 2008

(30) Foreign Application Priority Data

Aug. 18, 2006 (JP) .......................... P2006-223375

(51) Int. Cl.
B62D 25/20 (2006.01)
(52) U.S. Cl. .................................... 296/75; 296/193.07
(58) Field of Classification Search ................... 296/75, 296/184.1, 187.08, 193.07, 204, 203.03, 296/77.1, 79, 80, 193.01; 280/163
See application file for complete search history.

(56) References Cited

U.S. PATENT DOCUMENTS

| | | | |
|---|---|---|---|
| 5,327,989 A * | 7/1994 | Furuhashi et al. | 180/248 |
| 5,560,674 A * | 10/1996 | Tazaki et al. | 296/193.01 |
| 6,460,918 B1 * | 10/2002 | Sato et al. | 296/204 |
| 6,517,111 B2 | 2/2003 | Mizuta | |
| 6,761,390 B1 * | 7/2004 | Osborne et al. | 296/75 |
| 7,510,235 B2 * | 3/2009 | Kobayashi et al. | 296/193.01 |
| 2002/0096904 A1 * | 7/2002 | Matsushita | 296/75 |

* cited by examiner

*Primary Examiner*—Glenn Dayoan
*Assistant Examiner*—Melissa A Black
(74) *Attorney, Agent, or Firm*—Wenderoth, Lind & Ponack, L.L.P.

(57) ABSTRACT

A floor structure of a four wheeled utility vehicle by which a passenger can quickly and simply maintain a proper riding posture in the case of a swing and an inclination of the vehicle. A cabin housing an operating portion of a vehicle and a passenger seat is provided between front wheels and rear wheels, and a floor constituted by a floor plate is provided in a lower end portion of the cabin. The floor plate is provided with a foot pressing surface against which a passenger can press a bottom surface of the passenger's foot. Preferably, the foot pressing surface is inclined so as to ascend in a forward direction of the vehicle.

2 Claims, 10 Drawing Sheets

FLOOR STRUCTURE OF FOUR WHEELED UTILITY VEHICLE

BACKGROUND OF THE INVENTION

1. Field of the Invention

The present invention relates to a floor structure of a four wheeled utility vehicle, more particularly relates to a floor structure thereof.

2. Description of Related Art

In case of motor cars for running on a general driveway, some of the motor cars have a footrest for placing a foot of a driver which does not carry out a pedal operation in front of a driver seat, as well as pedals such as an accelerator pedal, a brake pedal and the like.

On the contrary, in the four wheeled utility vehicle for running mainly on an undulating ground surface, the accelerator pedal and the brake pedal are arranged on the floor in front of the driver seat in the same manner as the motor cars mentioned above. However, the footrest for supporting the driver's foot, which does not carry out the pedal operation so as to rest, is not provided. In other words, since the four wheeled utility vehicle is swung or inclined while running on a ground surface having concavities and convexities, it is hard for the driver to maintain a riding posture in a state of resting the driver's foot which does not carry out the pedal operation, and it is not necessary to utilize the footrest. As an example of the four wheeled utility vehicle, there is U.S. Pat. No. 6,517,111.

Although the four wheeled utility vehicle does not particularly require the footrest, it is sometimes necessary for the driver to strongly press a back or bottom surface of the driver's foot which does not carry out the pedal operation against the floor surface or a frame portion near the foot so as to achieve a strut state for maintaining a proper riding posture when the vehicle is swung or inclined. However, it is hard to quickly select a suitable surface capable of maintaining a proper posture and press the foot against the suitable surface.

SUMMARY OF THE INVENTION

In view of foregoing, an object of the present invention is to provide a floor structure of a four wheeled utility vehicle by which a passenger can quickly and simply maintain a proper riding posture in the case of a swing and an inclination of the vehicle, while running on a ground surface having concavities and convexities.

In order to achieve the object, the present invention provides a floor structure of a four wheeled utility vehicle including a cabin arranged between front wheels and rear wheels and housing a seat for a passenger (driver and/or assistant driver) and an operating portion in front of the seat to steer the vehicle. The floor structure comprises: a floor provided in a lower end portion of the cabin; a foot pressing surface provided on the floor and against which the passenger is capable of pressing a bottom surface of the passenger's foot.

With this configuration, the passenger can quickly and simply maintain a proper riding posture by strongly pressing the foot against the foot pressing surface in the case of the swing and the inclination of the vehicle, while running on uneven ground having concavities and convexities.

Preferably, the foot pressing surface may be inclined so as to ascend forward.

With this configuration, the passenger can press the whole back surface of his foot against the foot pressing surface naturally when the passenger stretches the foot downward toward the front.

Preferably, the foot pressing surface may be formed approximately in parallel to a vehicle width direction or may be inclined to a center side of the vehicle width with respect to the vehicle width direction.

With this configuration, it is possible to form the foot pressing surface in a state in which the passenger can stretch his foot in a most natural state.

Preferably, the floor may have a rising wall that rises from a front end portion of the floor surface, and the foot pressing surface may be provided so as to extend from the floor surface to the rising wall.

With this configuration, it is possible to form the foot pressing surface in a truss structure, and it is possible to increase strength of the pressing surface.

Preferably, the foot pressing surface may be provided under a dashboard within the cabin in a longitudinal direction of the vehicle, and in a side end portion of the floor in the vehicle width direction.

With this configuration, the foot pressing surface does not form an obstacle at a time of driving or getting in and out of the vehicle.

In the present invention, the foot pressing surfaces may be provided in both side end portions of the floor in the vehicle width direction.

With this configuration, both a driver and an assistant driver can use the foot pressing surfaces.

In the present invention, the foot pressing surface may be removable from the floor.

With this configuration, it becomes easy to change a size and mounting position of the foot pressing surface.

The above and further objects and features of the invention will more fully be apparent from the following detailed description together with the accompanying drawings.

DETAILED DESCRIPTION OF THE PREFERRED EMBODIMENTS

Figure 1:
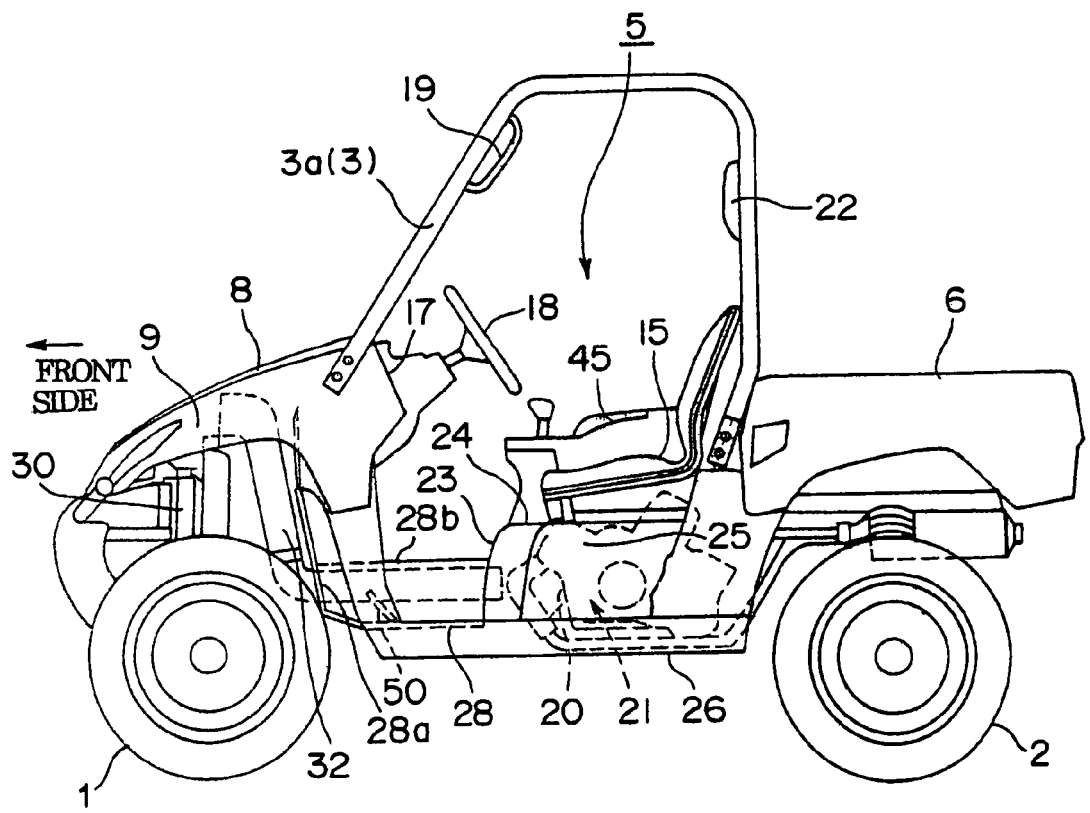
FIG. 1 is a left side elevational view showing an embodiment of a four wheeled utility vehicle provided with a floor structure in accordance with an embodiment of the present invention.

FIGS. 1 to 10 show a four wheeled utility vehicle provided with a floor structure in accordance with an embodiment of the present invention. A description will be given of an embodiment in accordance with the present invention with reference to these drawings. In this case, in a concept of directions used for the following description, a front side as seen from a passenger riding in the vehicle shown in FIG. 1 is called a front side of the vehicle and each of constituting elements of the vehicle, and a right and left directions as seen from the passenger are called a right direction and a left direction of the vehicle except for a case specially illustrated.

[Whole Structure of Four Wheeled Utility Vehicle]

Figure 2:
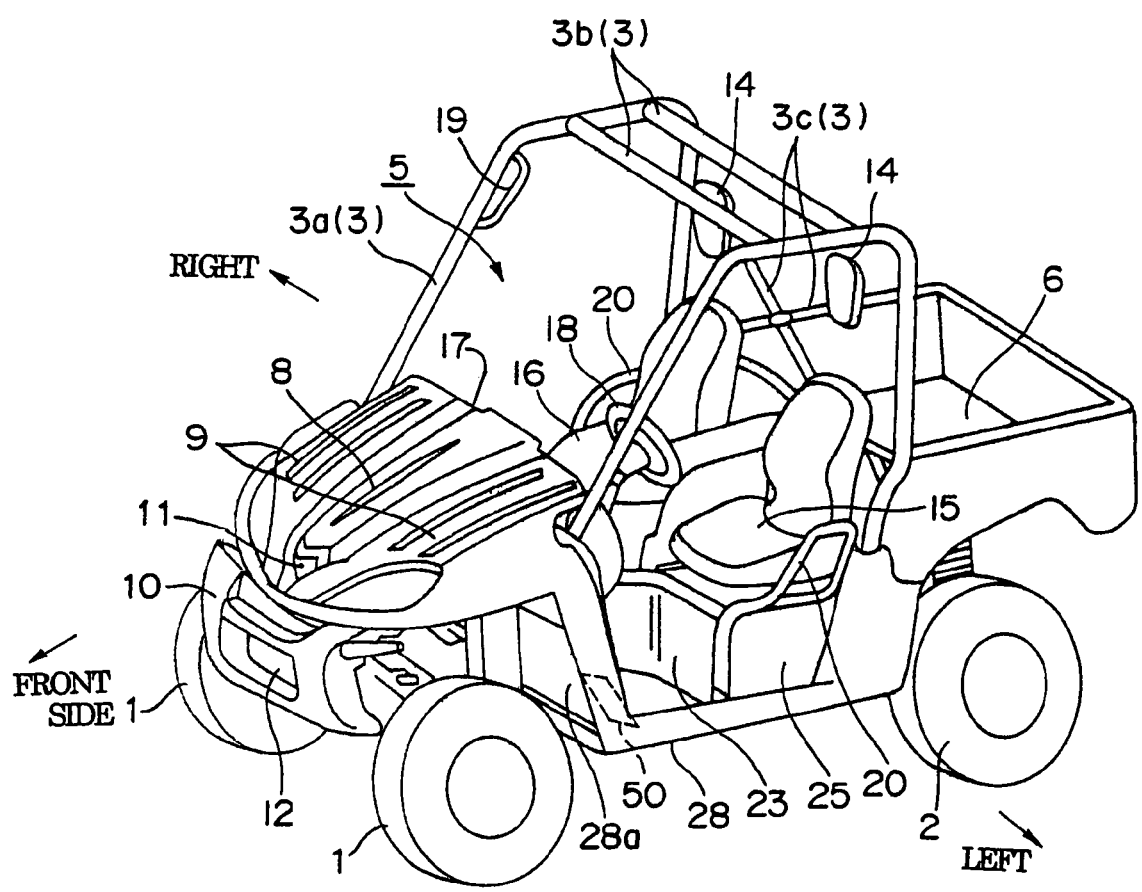
FIG. 2 is a simplified perspective view of the four wheeled utility vehicle of FIG. 1.

FIG. 2 is a simplified perspective view of the four wheeled utility vehicle. A pair of right and left front wheels 1 are provided in a front portion of the vehicle, a pair of right and left rear wheels 2 are provided in a rear portion of the vehicle, a cabin 5 surrounded by a protecting frame 3 is provided between the front wheels 1 and the rear wheels 2, and a carrier 6 is provided behind the cabin 5. Further, the vehicle is provided with a bonnet 8, a pair of front fenders 9 and a bumper 10 in front of the cabin 5. The bonnet 8 covers a space formed between the right and left front wheels 1 at a front portion of the vehicle. The front fenders 9 are arranged on right and left sides of the bonnet 8 and cover upper sides and rear sides of the front wheels 1. The bumper 10 is provided at a front head portion of the vehicle and is positioned at a forward downward position of the bonnet 8. The cabin 5 is open at a front portion, right and left side portions, an upper portion and a rear portion. In other words, the cabin 5 is not provided with a front glass, side doors, a ceiling wall and the like.

The protecting frame 3 comprises a pair of right and left C-shaped side frame members 3a, a pair of front and rear upper coupling members 3b coupling upper end portions of the right and left side frame members 3a, and rear coupling members 3c coupling rear portions of the right and left side frame members 3a in an X-shaped form. The rear frame members 3c are provided with a pair of right and left headrests 14, and a hand grip 19 is provided in a front upper end portion of the right side frame member 3a.

A driver seat 15 and an assistant driver seat 16 are installed in a rear portion of the cabin 5 at a left side and a right side, respectively. Also, a dashboard (an operating portion) 17 is provided in a front portion within the cabin 5. A left side portion of the dashboard 17 is provided with a steering handle 18 for steering the vehicle. The handle 18 is positioned in front of the driver seat 15. Further, vehicle meters and switches are provided within the dashboard 17. A pair of right and left C-shaped guards 20 are respectively provided in a right side of the assistant driver seat 16 and a left side of the driver seat 15.

Figure 3:
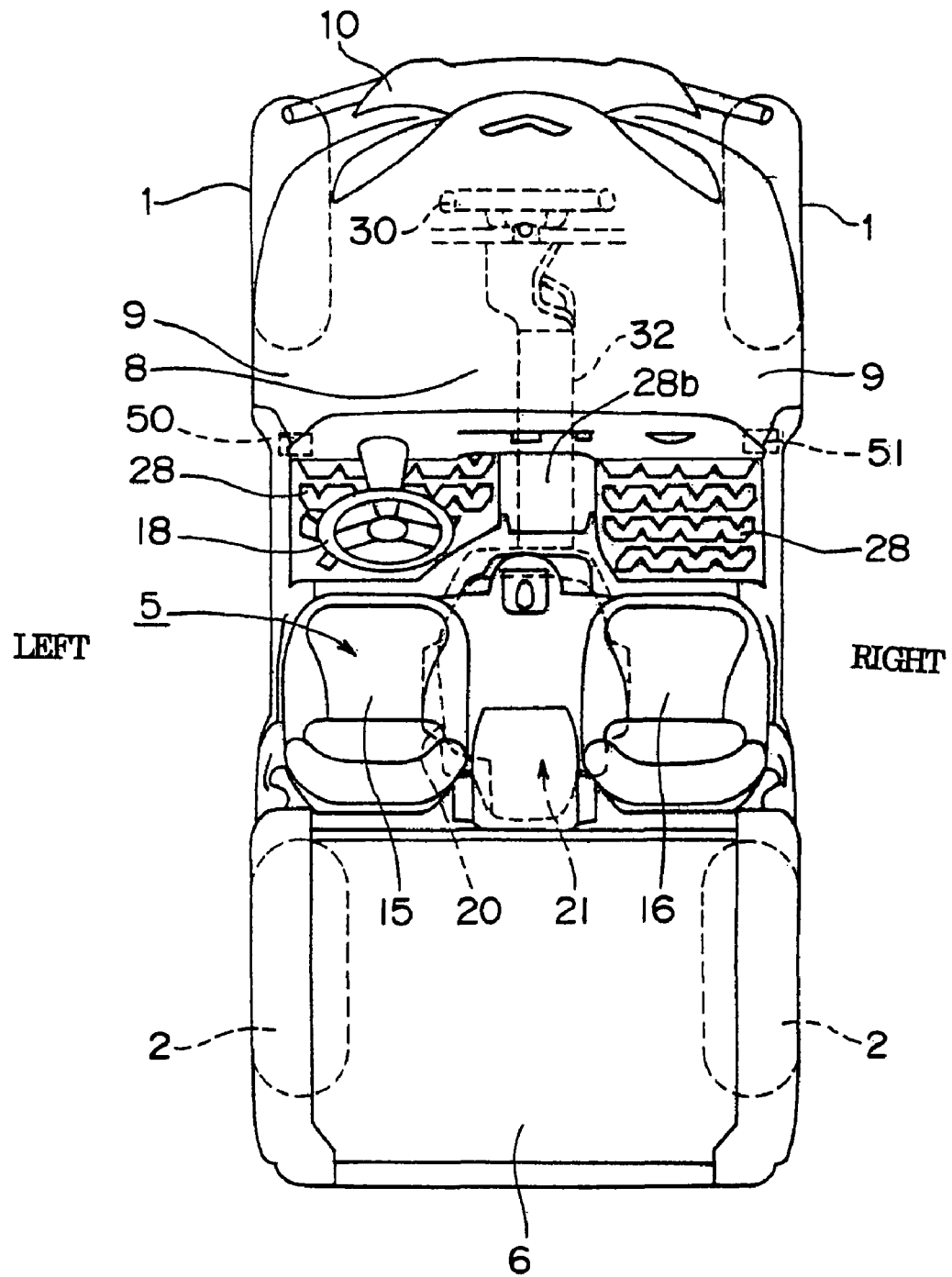
FIG. 3 is a plan view of the four wheeled utility vehicle of FIG. 1.

FIG. 3 is a plan view of the four wheeled utility vehicle showing in a state in which the protecting frame 3 (FIGS. 1 and 2) is detached. An engine room 21 is provided at a lower position than each of the seats 15 and 16 between the driver seat 15 and the assistant driver seat 16, and an engine 20a is mounted within the engine room 21. The engine room 21 is expanded to a space under the left and right seats 15 and 16, and equipment, for example, a battery (not shown), electrical equipment and the like are accommodated in the expanded space under the driver seat 15 and equipment, for example, a fuel tank (not shown) is accommodated in the expanded space under the assistant driver seat 16. A radiator 30 is provided in a space within the bonnet 8.

FIG. 1 is a left side elevational view of the four wheeled utility vehicle. The engine room 21 is covered at a front side by a front wall 23 and is covered at an upper side by an upper wall 24. The front wall 23 and the upper wall 24, respectively, extend right and left to the room expanded space under the seats 15 and 16. Right and left sides of the engine room 21 are respectively covered by a side wall 25, and a lower side of the engine room 21 is covered by an under guard 26.

(Floor Structure Including Air Duct Structure)

Figure 5:
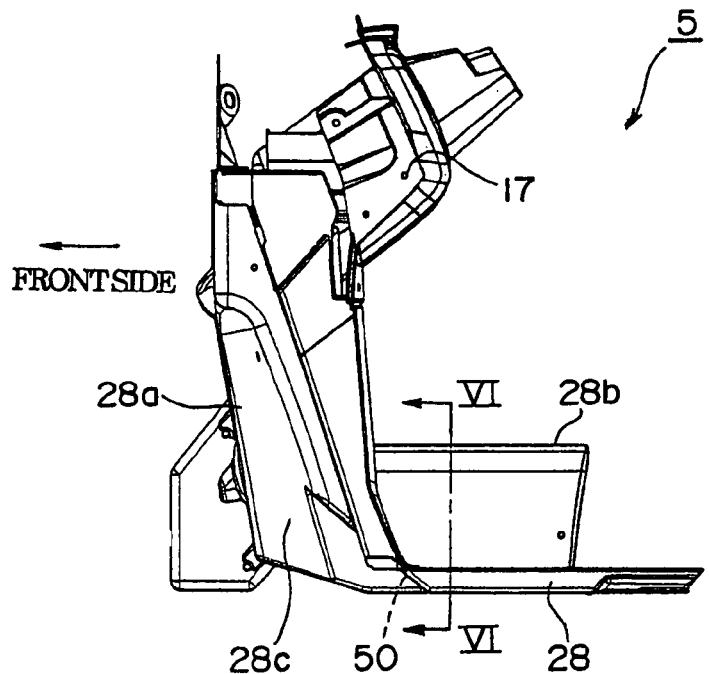
FIG. 5 is a left side elevational view of the floor plate and the dashboard of FIG. 4.

As shown in FIG. 1, a lower end portion of the cabin 5 is provided with a floor plate 28 approximately horizontally extending forward from a lower end portion of the front wall 23 of the engine room 21 so as to construct a floor, and a rising wall 28a, which rises up from a front end of the floor plate 28 under the dashboard 17, is formed integrally with the floor plate 28, as shown in a side elevational enlarged view of the floor plate 28 in FIG. 5, and the cabin 5 is compartmented from a space under the bonnet 8 and the front fenders 9 in the front side of the cabin, by the rising wall 28a, as shown in FIG. 1.

As shown in FIG. 1, an air duct 32 is configured to guide air from outside into the engine room 21 for cooling an inside of the engine room 21. The air duct 32 is connected to the front wall 23 of the engine room 21, and the air duct 32 extends forward approximately in parallel to the floor plate 28 from the inside of the engine room 21. The air duct 32 protrudes into the space under the bonnet 8 from the inside of the cabin 5 through a through hole formed in the rising wall 28a, rises up along a front surface of the rising wall 28a within the bonnet 8, is bent forward at a position near the lower surface of the bonnet 8 in an upper end portion, and is open forward at a front upper end portion of the air duct 32.

Figure 4:
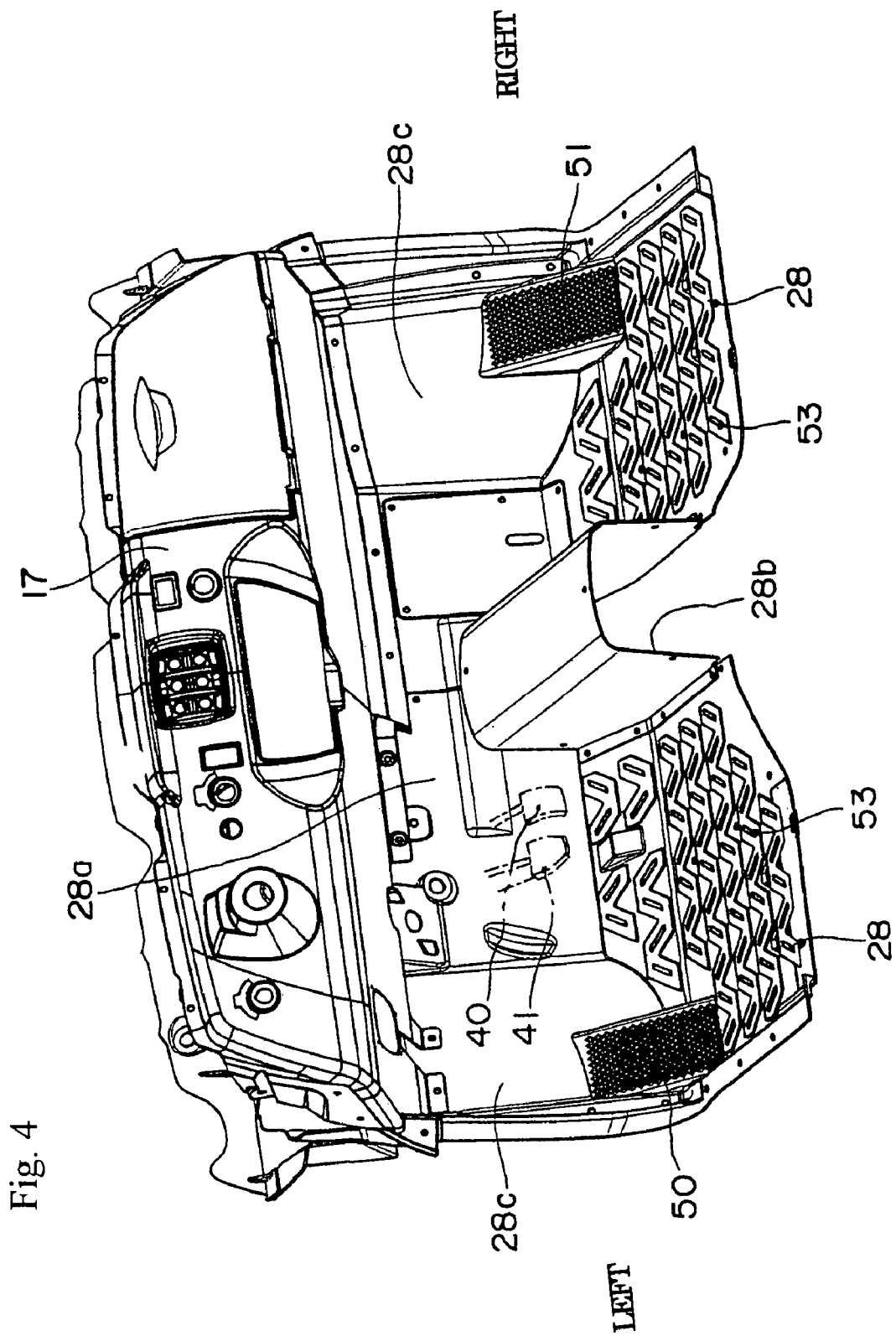
FIG. 4 is a perspective view of a floor plate and a dashboard of the four wheeled utility vehicle of FIG. 1.

FIG. 4 is an enlarged perspective view of the dashboard 17 and the floor plate 28. The floor plate 28 is provided with an inverted U-shaped portion 28b protruding upward in approximately a center portion in the vehicle width direction, and the air duct 32 (FIG. 1) is arranged within the inverted U-shaped portion 28b. In the whole region of the floor plate 28, a left region of the inverted U-shaped portion 28b is for the driver, an accelerator pedal 40 and a brake pedal 41 are arranged in a front portion of the left region in the order from the inverted U-shaped portion 28b, as shown by an imaginary line. A left side foot pressing surface 50 is integrally formed with the floor plate 28, in a left end portion of the left region. Further, the rising wall 28a integrally has rearward protruding curved portions 28c at the right and left side end portions, respectively, and the left side foot pressing surface 50 is formed from the floor plate 28 to the curved portion 28c on the left side of the rising wall 28a.

In the whole region of the floor plate 28, a right region of the inverted U-shaped portion 28b is for the assistant driver, a right side foot pressing surface 51 is integrally formed with the floor plate 28 in a right end portion of the right region, and the right side foot pressing surface 51 is formed from the floor plate 28 to the curved surface 28c on the right side of the rising wall 28a. The left and right foot pressing surfaces 50 and 51 are integrally formed of the same material together with the floor plate 28 and the rising wall 28a (including the curved portion 28c).

Figure 6:
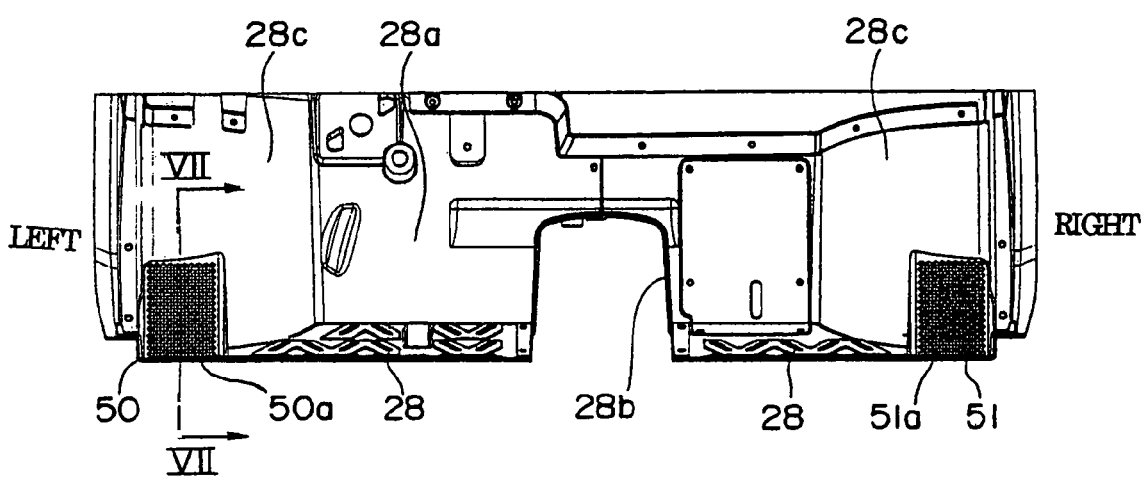
FIG. 6 is a cross sectional view along a line VI-VI of FIG. 5.

FIG. 6 is a cross sectional view taken along line VI-VI in FIG. 5 corresponding to a side elevational view of the floor plate 28 and the like. The right and left foot pressing surfaces 51 and 50 are formed approximately as a symmetrical shape as seen from a rear side.

Figure 7:
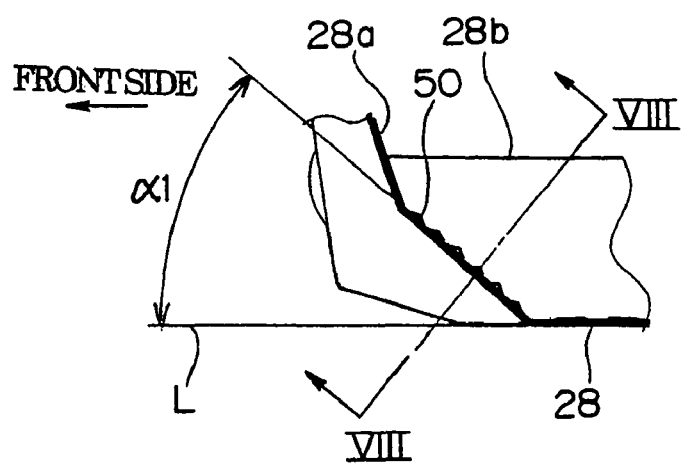
FIG. 7 is a cross sectional view along a line VII-VII of FIG. 6.

FIG. 7 is a cross sectional view taken along line VII-VII in FIG. 6. The left side foot pressing surface 50 is arranged in a position under the dashboard 17 (a position approximately just under the dashboard 17) in the longitudinal direction of the vehicle, and is provided in a state of being inclined to ascend forward at a predetermined angle $\alpha 1$ with respect to a horizontal surface L of the horizontal floor plate 28. In the embodiment, the angle $\alpha 1$ of gradient is set, for example, to about 45 degrees, however, the angle is preferably set in a range between 40 degrees and 70 degrees. The right side foot pressing surface 51 shown in FIG. 4 is inclined so as to ascend forward at the predetermined angle $\alpha 1$ (refer to FIG. 7) with respect to the horizontal surface L, in the same manner as the left side foot pressing surface 50.

Figure 8:
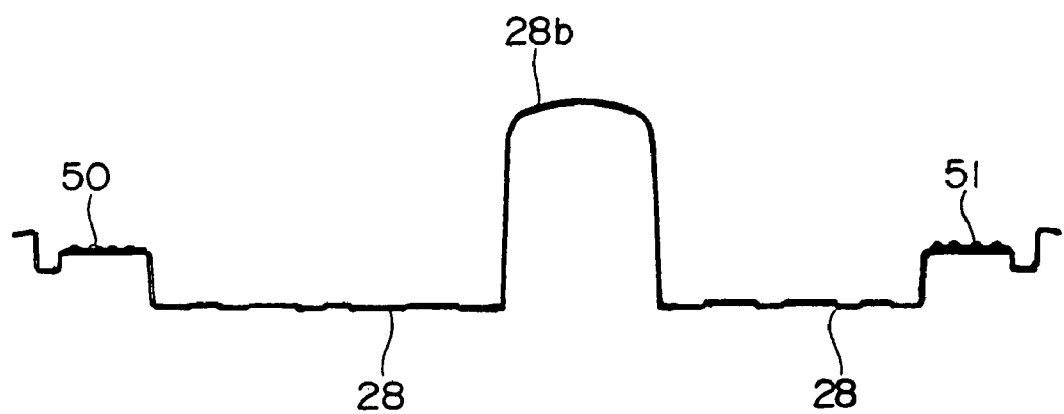
FIG. 8 is a cross sectional view along a line VIII-VIII of FIG. 7.

FIG. 8 is a cross sectional view taken along line VIII-VIII in FIG. 7.

Both the foot pressing surfaces 50 and 51 are formed in parallel to the vehicle width direction. In other words, the foot pressing surfaces 50 and 51 are formed such that a horizontally cut end surface is in parallel to the vehicle width direction.

Figure 9:
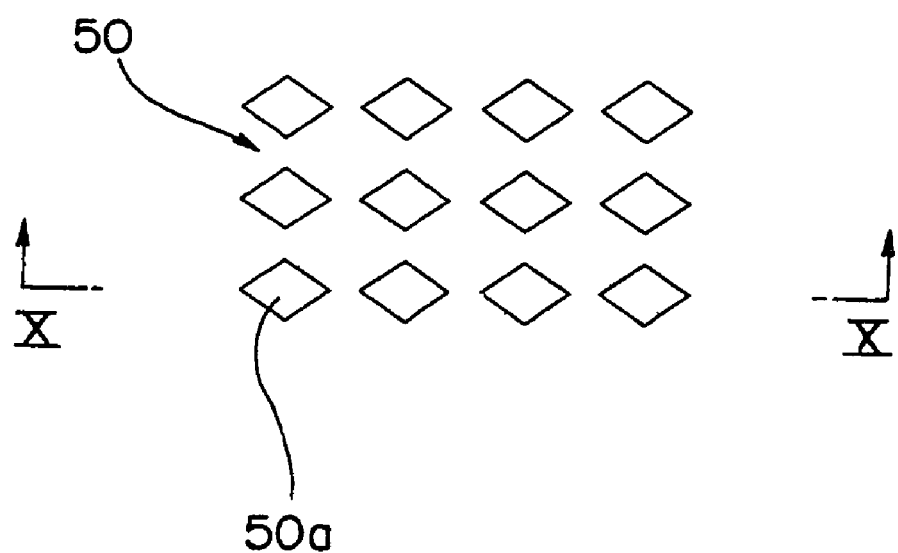
FIG. 9 is an enlarged partial plan view of a surface shape of a foot pressing surface of FIG. 4.
Figure 10:
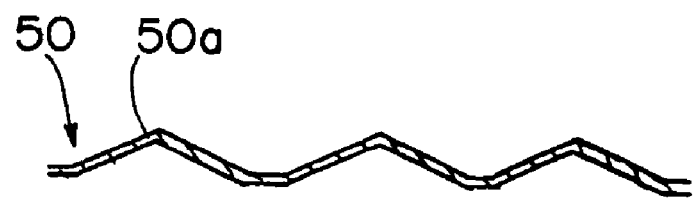
FIG. 10 is a cross sectional view along a line X-X of FIG. 9.

FIG. 9 is an enlarged partial plan view showing a surface shape of the left side foot pressing surface 50, and FIG. 10 is the cross sectional view taken along line X-X in FIG. 9. A lot of rhomboid convex portions 50a are formed to provide slip resistance approximately over a whole surface of the left side foot pressing surface 50. A lot of similar rhomboid convex portions 51a are formed approximately over a whole surface on the right side foot pressing surface 51 in FIG. 4.

In this case, as shown in FIG. 4, a lot of projections 53 formed as a V-shaped form in a plan view are continuously formed to provide slip resistance on a surface (an upper surface) of the floor plate 28.

[Operation]

In FIG. 2, when the vehicle swings or inclines during the running operation, the driver sitting on the driver seat 15 strongly presses his left foot against the left side foot pressing surface 50, thereby maintaining the driving posture so as to prevent an off-balance position. On the other hand, the assistant driver sitting on the assistant driver seat 16 grips the hand grip 19 with the right hand, and strongly presses his right foot against the right side foot pressing surface 51 (FIG. 4), thereby maintaining the posture so as to prevent an off-balance position. Further, the postures of the driver and the assistant driver are kept in proper posture by utilizing the respective guards 20 and the head rests 14 together with the strut by their foot.

Effects of the Embodiment (1) Since the floor plate 28 is provided with the foot pressing surfaces 50 and 51 against which the driver and the assistant driver can respectively press the bottom surfaces of their feet, the driver and the assistant driver can quickly and simply maintain the proper riding posture by strongly pressing the bottom surfaces of their foot against the foot pressing surfaces 50 or 51 in the case of the swing and the incline of the vehicle while running on uneven ground having the concavities and convexities.

(2) In the four wheeled vehicle in which the engine 20a is mounted near the seats 15 and 16, the vibration of the engine 20a tends to be transmitted to the passenger (s) (the driver and/or the assistant driver), however, it is possible to maintain the proper riding posture even in the four wheeled utility vehicle mentioned above.

(3) Since the foot pressing surfaces 50 and 51 rise up from the position under the dashboard 17 so as to be inclined to ascend forward, the driver and the assistant driver can strongly press the whole bottom surfaces of their feet against the foot pressing surfaces 50 or 51 naturally when they stretch their foot downward to the front in the sitting state. Further, since the foot pressing surfaces 50 and 51 are located at the position under the dashboard 17, the foot pressing surfaces 50 and 51 do not form an obstacle at a time of driving or when entering or exiting the vehicle.

(4) Since the foot pressing surfaces 50 and 51 are provided from the floor plate 28 to the curved portion 28c of the rising wall 28a, a truss structure is formed, and it is thus possible to increase the strength of the pressing surfaces 50 and 51.

(5) Since the foot pressing surfaces 50 and 51 are integrally formed with the floor plate 28, it is easy to manufacture the foot pressing surfaces 50 and 51.

Figure 11:
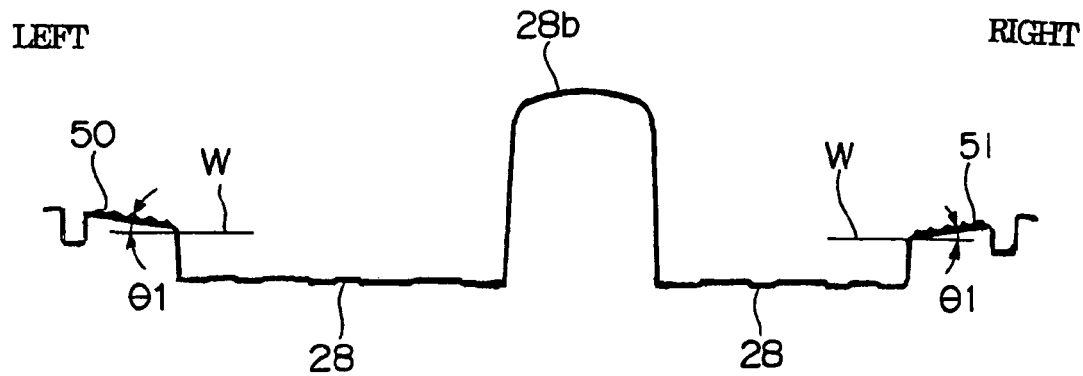
FIG. 11 is a cross sectional view showing a modified embodiment of the foot pressing surface in the same manner as FIG. 8.

Other Embodiment of the Present Invention (1) FIG. 11 shows a modified embodiment of the foot pressing surfaces 50 and 51. The left side foot pressing surface 50 is downwardly inclined rightward (toward a center side of the vehicle width), more particularly, a horizontally cut end surface of the foot pressing surface 50 is inclined toward a center side of the vehicle width by a predetermined angle $\theta 1$ with respect to a vertical surface W which is in parallel to the vehicle width direction. Meanwhile, the right side foot pressing surface 51 is inclined leftward (toward the center side of the vehicle width), more particularly, a horizontally cut end surface of the foot pressing surface 51 is inclined toward a center side of the vehicle width by a predetermined angle $\theta 1$ with respect to a horizontal surface W which is in parallel to the vehicle width direction. The angle $\theta 1$ of gradient is set to a small angle, for example, between 5 degrees and 10 degrees.

In this case, the driver and the assistant driver can press the whole bottom surface of their feet against the foot pressing surfaces 50 and 51 naturally by inclining the foot pressing surfaces 50 and 51 toward the center of the vehicle width direction.

Figure 12:
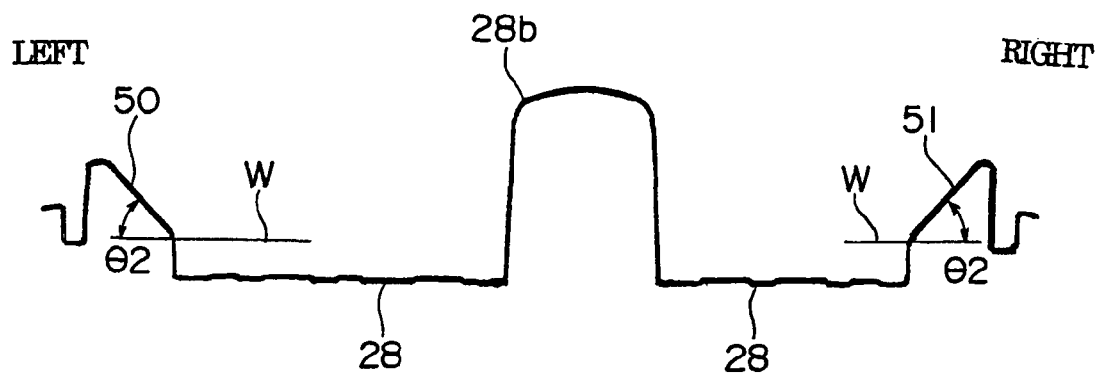
FIG. 12 is a cross sectional view showing another modified embodiment of the foot pressing surface in the same manner as FIG. 8.

(2) FIG. 12 shows a structure in which the left side foot pressing surface 50 is downwardly inclined rightward (toward a center side of the vehicle width), and the right side foot pressing surface 51 is inclined leftward (toward the center side of the vehicle width) similar to FIG. 11. However, horizontally cut end surfaces of the foot pressing surfaces 50 and 51 of FIG. 12 are inclined toward a center side of the vehicle width by a predetermined angle $\theta 2$ which is larger than the angle $\theta 1$ of FIG. 11 with respect to a horizontal surface W which is parallel to the vehicle width direction. The angle $\theta 2$ of gradient is enlarged, for example, to 45 degrees.

Figure 13:
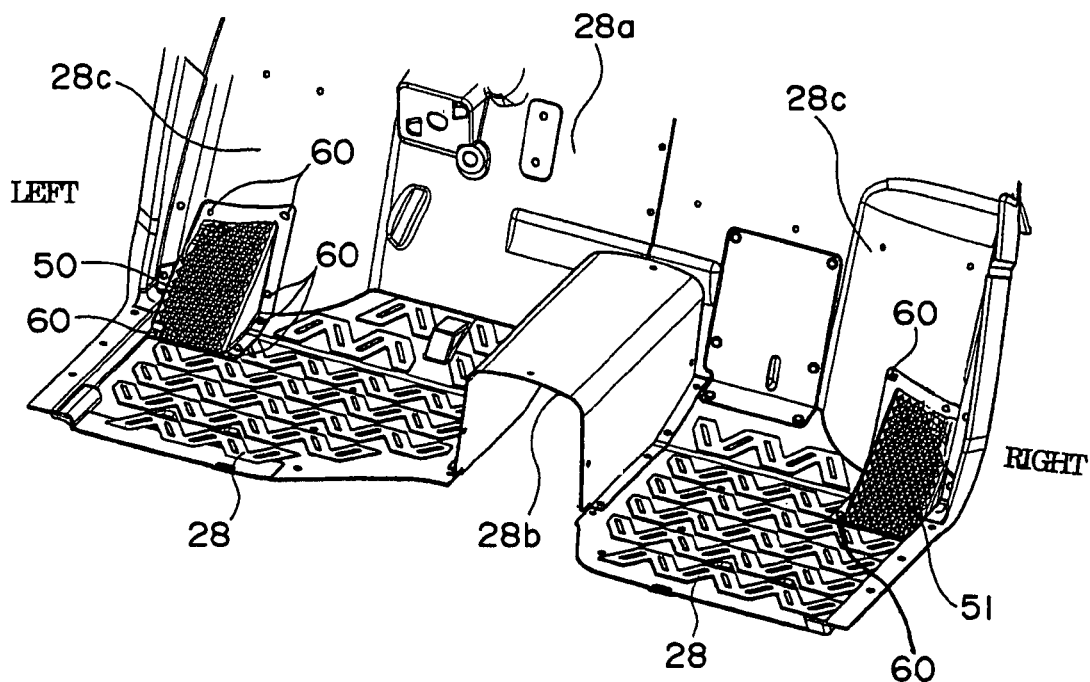
FIG. 13 is a cross sectional view showing another modified embodiment of the foot pressing surface in the same manner as FIG. 4.
Figure 14:
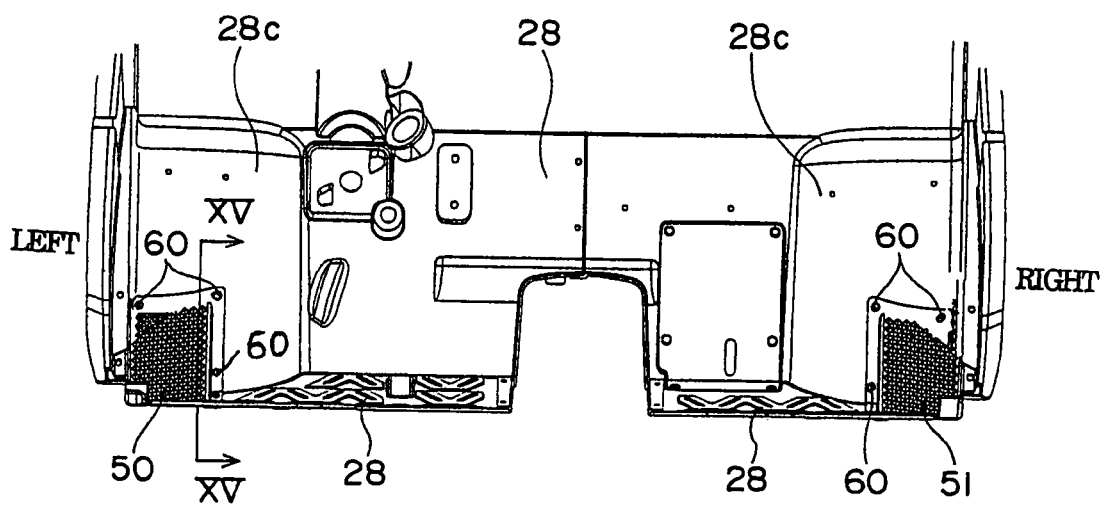
FIG. 14 is a cross sectional view showing the floor plate and the like in FIG. 13 in the same manner as FIG. 6.
Figure 15:
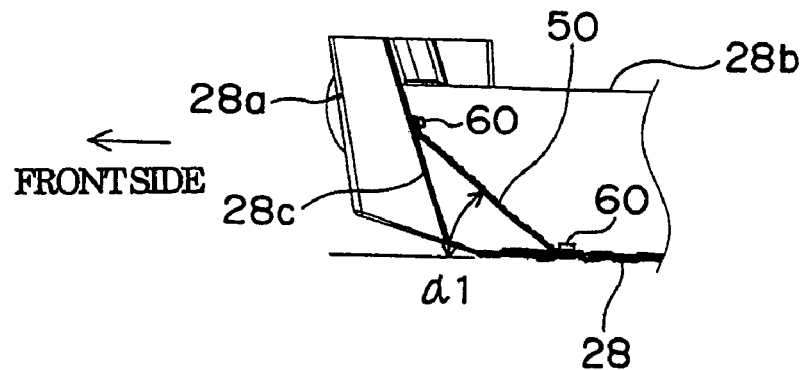
FIG. 15 is a cross sectional view along a line XV-XV of FIG. 14.

(3) FIGS. 13 to 15 show a structure in which the right and left foot pressing surfaces 51 and 50 are formed by separate members from the floor plate 28, and are firmly attached to the floor plate 28 and the curved portion 28c of the rising wall 28a by screws 60. The other structures are the same as those of the embodiment in FIGS. 1 to 10, and the same reference numerals are attached to the same parts. It is possible to optionally attach the foot pressing surfaces 50 and 51 which are different in the angle $\alpha 1$ of gradient of the forward ascending or the angle $\theta 1$ of gradient to the right and left, for example, while setting the floor plate 28 in common in accordance with the vehicle types, by setting the foot pressing surfaces 50 and 51 to the floor plate 28.

Figure 16:
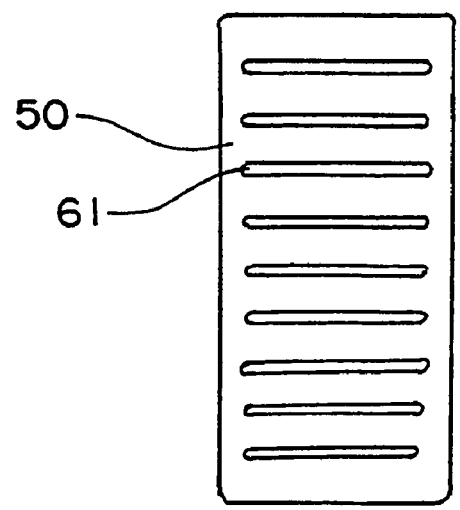
FIG. 16 is a plan view showing a modified embodiment of a surface shape of the foot pressing surface.

(4) FIG. 16 shows another surface shape of the foot pressing surface in which a lot of ribs 61, extending linearly to the right and left, are formed to provide slip resistance of the surface.

(5) In each of the embodiments mentioned above, there is employed the structure in which the foot pressing surface is inclined to ascend forward, however, the foot pressing surface may be formed vertically. In this case, the structure is at least made, in the same manner as the structure of FIGS. 11 and 12, such that the left side foot pressing surface 50 for the driver is inclined rightward (toward the center side of the vehicle width) and the right side foot pressing surface 51 for the assistant driver is inclined leftward (toward the center side of the vehicle width).

(6) The shape of the convex portions 50*a* formed in the foot pressing surface 50 is not limited to the rhomboid shape or the rib shape, but can employ various shapes such as a triangular shape, a circular shape and the like.

(7) The present invention is not limited to each of the embodiments mentioned above, but can include various modified embodiments within the scope of the claims.

What is claimed is:

1. A floor structure of a four wheeled utility vehicle including a cabin arranged between front wheels and rear wheels, the cabin housing a seat for a passenger and an operating portion in front of the seat to steer the vehicle, the floor structure comprising;

a floor provided in a lower end portion of the cabin;

a first foot pressing surface provided on the floor and against which the passenger is capable of pressing a bottom surface of the passenger's foot;

a rising wall rising up from a front end of the floor, the rising wall compartmenting the cabin from a space under a bonnet in front of the cabin, and the rising wall being formed integrally with the floor, wherein the first foot pressing surface extends from the floor surface to the rising wall, and the first foot pressing surface is inclined so as to ascend in a forward direction; and a second foot pressing surface disposed on an opposite side of the floor relative to the first foot pressing surface, wherein the first and second foot pressing surfaces are provided with a plurality of rhomboid convex portions to provide slip resistance, wherein the rising wall has rearwardly protruding partial cylindrical shaped curved portions in right and left side end portions thereof, and the foot pressing surfaces are formed so as to extend from the floor to the curved portions of the rising wall, wherein the curved portions are curved into the cabin, and the first and second foot pressing portions are each further inclined inward toward a center of the floor.

2. The floor structure of the four wheeled utility vehicle as claimed in claim 1, wherein the first and second foot portions, the rising wall and the floor are integrally formed.

* * * * *